US 6,572,317 B2

(12) United States Patent
Okada et al.

(10) Patent No.: US 6,572,317 B2
(45) Date of Patent: Jun. 3, 2003

(54) RESILIENT FASTENER CLIP

(75) Inventors: Shigeo Okada, Kanagawa-ken (JP); Kazunori Machida, Kanagawa-ken (JP); Hiroshi Takemoto, Saitama-ken (JP)

(73) Assignees: Piolax Inc., Kanagawa-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/950,658

(22) Filed: Sep. 13, 2001

(65) Prior Publication Data

US 2002/0037206 A1 Mar. 28, 2002

(30) Foreign Application Priority Data

Sep. 14, 2000 (JP) .......................................... 2000-279459

(51) Int. Cl.⁷ .............................. F16B 13/04; F16B 19/00
(52) U.S. Cl. ........................ 411/508; 411/182; 411/913; 24/297
(58) Field of Search ................................. 411/508, 509, 411/510, 182, 913; 24/297

(56) References Cited

U.S. PATENT DOCUMENTS 3,678,797 A * 7/1972 Seckerson ................. 411/509
5,573,362 A * 11/1996 Asami et al. .............. 411/509
5,651,652 A * 7/1997 Williams et al. ......... 411/509 X
6,305,055 B1 * 10/2001 Castro ..................... 411/509 X

FOREIGN PATENT DOCUMENTS

JP          982411          6/1997

OTHER PUBLICATIONS

English Language Translation for JP Appln. No. 982411.
Registered Similar Design 2 of Japanese Patent Publication No. 855669, Sep. 10, 1993.

* cited by examiner

*Primary Examiner*—Neill Wilson
(74) *Attorney, Agent, or Firm*—Greenblum & Bernstein, P.L.L.C.

(57) ABSTRACT

A fastener has a head for retaining a vehicle component and a leg to be fitted into a mounting hole of a panel. The leg has a plurality of resilient engaging walls extending in the axis direction with a plurality of vertical slits interposed therebetween. Upper ends of the walls are connected to the head and lower ends of the walls are connected to one another. Each upper end connected to the head is provided with a lateral cut. The presence of the cut makes the wall to easily flex inwardly when the leg is inserted into the mounting hole of the panel, enabling the insertion of the leg with smaller force, resulting in significant improvement in workability.

4 Claims, 5 Drawing Sheets

RESILIENT FASTENER CLIP

BACKGROUND OF THE INVENTION

1. Field of the Invention

This invention relates to an improved fastener, and more particularly, to an improved fastener for fixing automobile interior components or electrical equipment to given panels.

2. Description of the Related Art

A conventional fastener for such a purpose is disclosed in Registered Similar Design 2 of Japanese Design Patent Publication No. 855669.

This conventional fastener is intended for fixing a trim board as a vehicle interior component, and consists of a head for retaining a trim board and a leg to be fitted into a mounting hole of a panel. The head has two retaining flanges spaced apart via a neck and a sealing flange. The leg has two resilient engaging walls extending in the axis direction with slits interposed therebetween. Upper ends of the engaging walls are in their entire surfaces connected to the sealing flange of the head, and lower ends of the walls are connected to one another.

In use, a trim board is retained between the retaining flanges of the head, and then the leg of the fastener is inserted through a mounting hole provided in a panel. The walls of the leg during insertion flex inwardly and pass through the mounting hole, and engage with the rim of the hole at their shoulders, thereby enabling fixing the trim board to the panel.

The conventional fastener has an advantage that a trim board can be fixed to a panel through final one-touch operation. However, when the leg of the fastener is inserted into a mounting hole of a panel, since the upper ends of the engaging walls each having a sectionally arc shape and extending in a curve radially about the axis of the leg are integrally connected in their entire surfaces to the sealing flange of the head, the engaging walls cannot provide sufficient flexibility on each side. This requires larger insertion force, preventing improvement in workability. In addition, when a mounting hole of a panel is a reversely punched hole, a resultant burr protruding to the insertion side further requires larger insertion force.

SUMMARY OF THE INVENTION

This invention was made to effectively solve the above problems of the conventional fastener.

According to a first aspect of this invention, there is provided a fastener comprising: a head for retaining a vehicle component; a leg to be fitted into a mounting hole of a panel, the leg comprising a plurality of resilient engaging walls extending in the axis direction with a plurality of vertical slits interposed therebetween; each resilient engaging wall having an upper end connected to the head; the resilient engaging walls being connected to one another at lower ends thereof; and a cut provided in a lateral direction in the upper end of each resilient engaging wall.

Thus in this aspect, since the lateral cut is provided in the upper end of the engaging wall connected to the head, when the leg of the fastener is inserted into a mounting hole of a panel, the cut allows the engaging wall to easily flex inwardly. This enables inserting the leg into the hole with smaller force, resulting in significant improvement in workability.

According to a second aspect of this invention, the cut is provided in a lateral direction on each side of the upper end of each resilient engaging wall.

Thus in this aspect, since the lateral cut is provided on each side of the upper end of the resilient engaging wall, which end is otherwise hard and does not easily flex inwardly, when the leg is inserted into a mounting hole, the engaging wall can flex to a much larger extent on both sides. This provides further improvement in workability and prevents the engaging wall from falling down or collapsing, ensuring secure and firm engagement of the leg.

According to a third aspect of this invention, the lateral cut provided on a thicker side of the resilient engaging wall has a depth larger than that of the lateral cut provided on a thinner side of the resilient engaging wall.

Thus in this aspect, the thicker part of the wall becomes more flexible due to the larger depth of cut, and the thinner part of the wall retains rigidity due to the smaller depth of cut, so that flexibility and rigidity are equalized on both sides of the wall. This prevents the wall from partially collapsing, and also from being partially shaved off by a burr of the rim of a reversely punched hole, thereby allowing the wall to flex evenly in a wider region with respect to the inner periphery of the hole, and resultantly to be inserted with smaller force. The wall then abuts against the inner periphery of the hole in a wider region, and can be even more sufficiently retained.

According to a fourth aspect of this invention, a fastener as set forth in the second aspect further comprising: a support wall provided between the resilient engaging walls, the support wall being connected to both the head and lower interconnected part of the resilient engaging walls; wherein, the lateral cut provided, with a perpendicular line to the support wall, passing through the axis thereof, as a center, on a larger width side of the resilient engaging wall in a direction along the support wall, has a depth larger than that of the lateral cut provided on a smaller width side of the resilient engaging wall.

Thus in this aspect, the wall on the larger width side is more flexible due to the larger depth of cut, and the wall on the smaller width side retains rigidity due to the smaller depth of cut, resulting in the effects as described above.

According to a fifth aspect of this invention, connected part of the upper end of each resilient engaging wall left between the lateral cuts provided on both sides has, with a perpendicular line to the support wall, passing through the axis thereof, as a center, a larger width on the larger width side of the resilient engaging wall in a direction along the support wall, than a width on the smaller width side of the resilient engaging wall.

Thus in this aspect, the wall on the larger width side becomes more flexible due to the larger depth of cut while being supported by the larger width part of the connected part, and the wall on the smaller width side retains rigidity due to the smaller depth of cut while being supported by the smaller width part of the connected part, thereby being equalized in flexibility and rigidity. The wall thus flexes evenly in a wider region with respect to the inner periphery of the hole of the panel, being able to be inserted into the hole with much smaller force. The wall also abuts evenly in a wider region against the inner periphery of the hole, being resultantly much more stably retained.

According to a six aspect of this invention, a fastener as set forth in the second aspect further comprising: a shoulder provided in an upper part of the resilient engaging wall, constituting a slope with a radius from the axis of the fastener increasing as being away from the head, the shoulder having different vertical positions across the resilient engaging wall; wherein, the lateral cut provided on a side where the shoulder is distanced larger from the head has a depth larger than that of the lateral cut provided on a side where the shoulder is distanced smaller from the head.

Thus in this aspect, the shoulder on the smaller distanced side has relatively high rigidity due to the smaller depth of cut, and engages with the inner periphery of the hole of the panel with sufficient strength after inserted into the hole and abutting on the inner periphery of the hole. The sufficient strength causes the wall to exert high stress at the shoulder. The shoulder on the larger distanced side has a radius from the axis of the fastener smaller than that on the other side, and that part is enhanced in flexibility due to the larger depth of cut, although the engaging strength of that part of the shoulder inserted into the hole of the panel and abutting on the inner periphery of the hole becomes slightly smaller. As a result, even when the fastener is under high temperature in a car in hot weather, for example, and has been used for a long time, the fastener is unlikely to creep or collapse, ensuring high durability.

BRIEF DESCRIPTION OF THE ACCOMPANYING DRAWINGS

The above and further objects and novel features of this invention will more fully appear from the following detailed description when the same is read in conjunction with the accompanying drawings, in which.

DETAILED DESCRIPTION OF THE PREFERRED EMBODIMENTS

With reference to the accompanying drawings, preferred embodiments of this invention will be described below.

Figure 1:
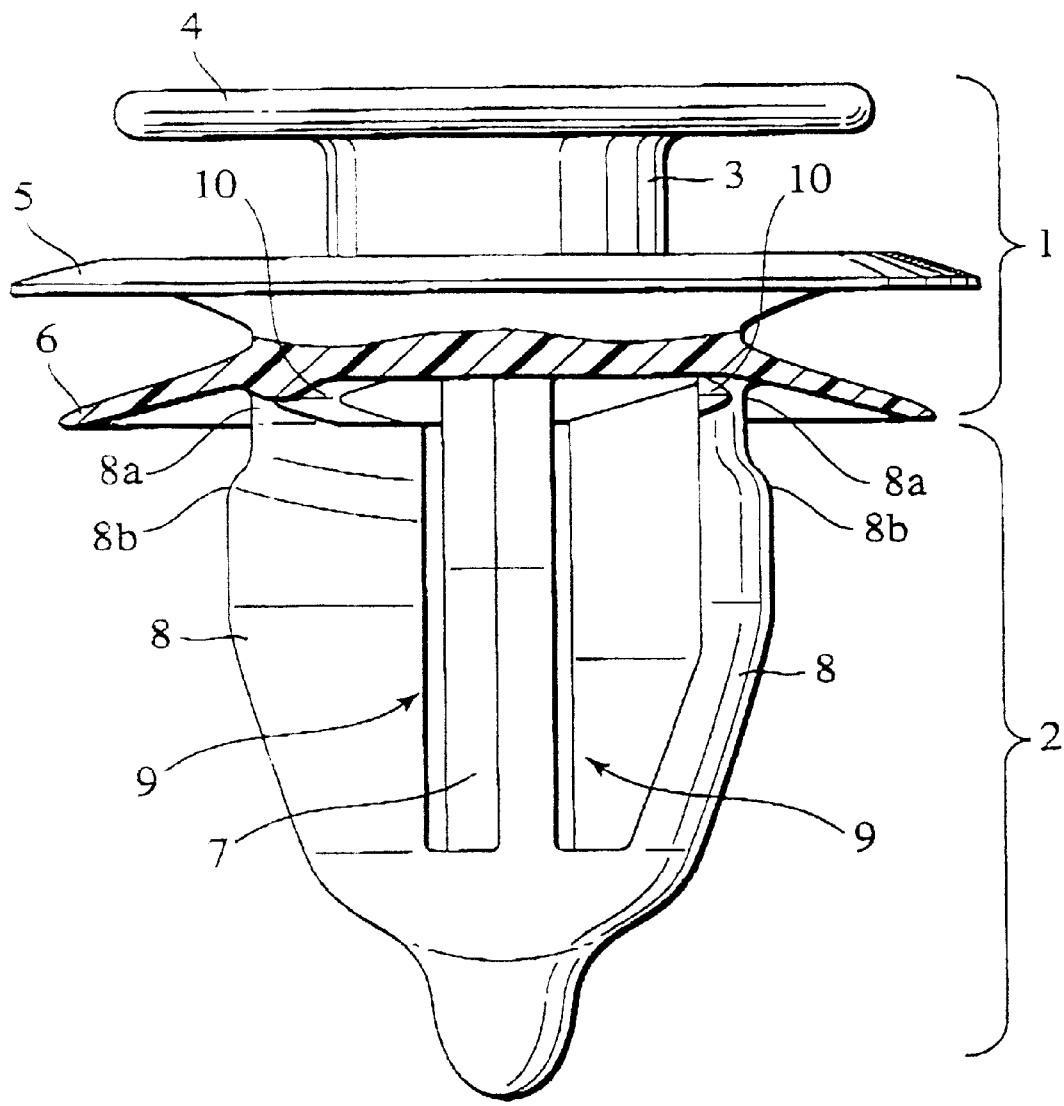
FIG. 1 is a partly cutaway front view of a fastener according to an embodiment of this invention.
Figure 2:
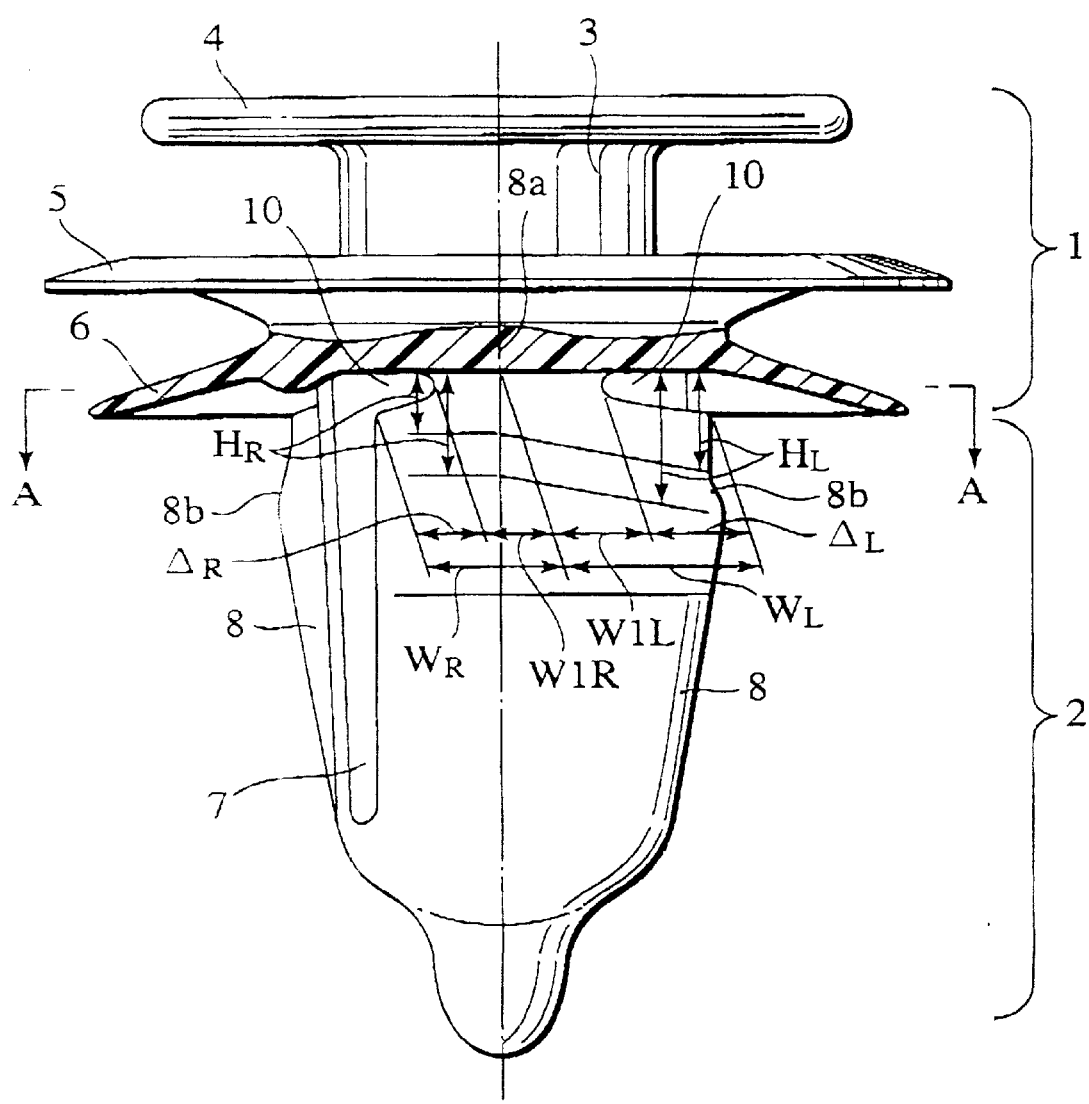
FIG. 2 is a partly cutaway side view of the fastener in FIG. 1.
Figure 3:
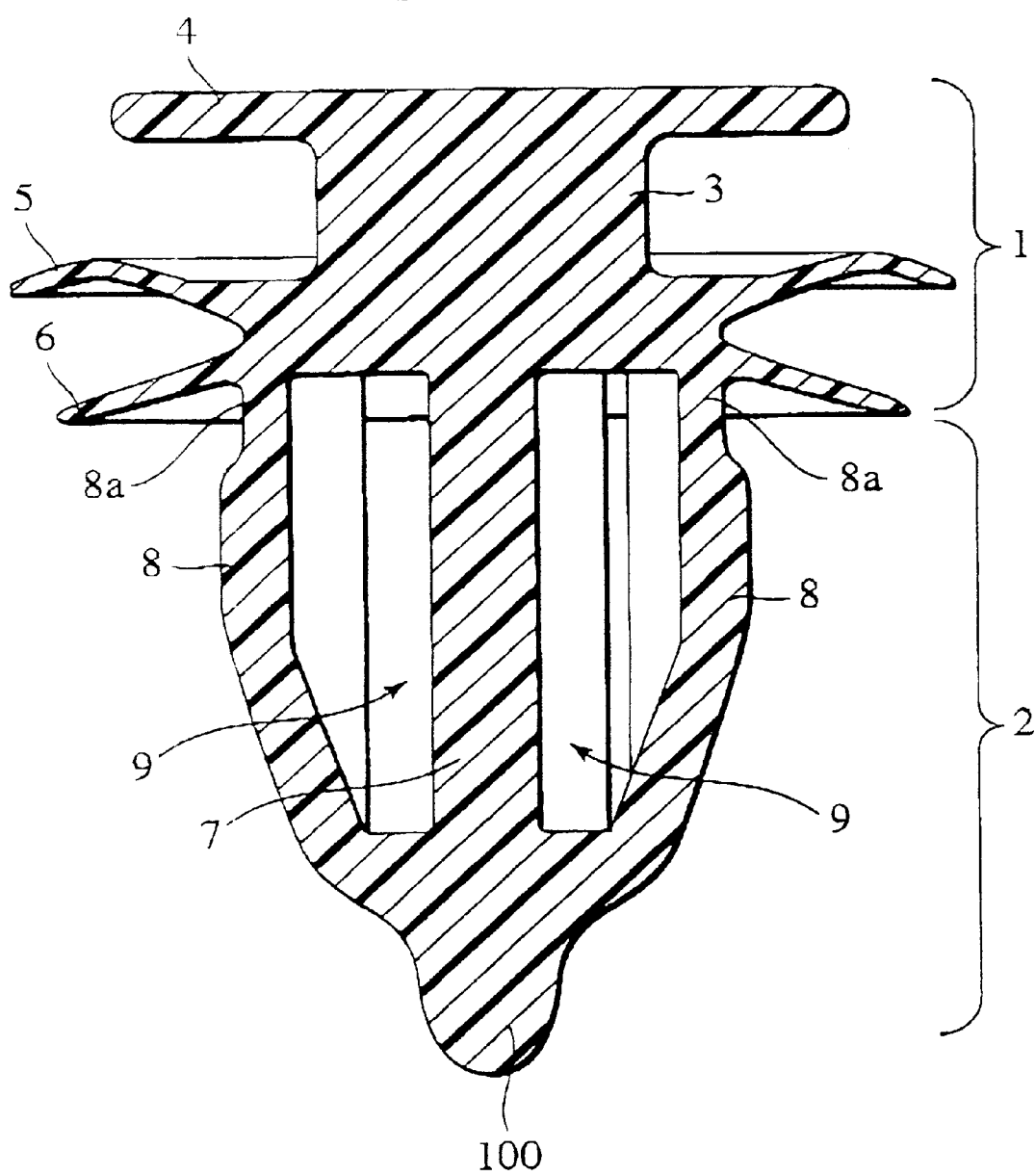
FIG. 3 is a sectional view taken along line B—B in FIG. 4.

A fastener according to this invention is an integrally-molded synthetic resin product, and is intended for fixing a trim board to a panel. As shown in FIGS. 1 to 3, the fastener has a head 1 for retaining a trim board, and a leg 2 to be fitted into a mounting hole of a panel. The head 1 has two retaining flanges 4 and 5 spaced apart via a neck 3, and a sealing flange 6. The leg 2 is provided with a support wall 7 integrated with and extending vertically downwards from the centerline of the rear surface of the sealing flange 6. The leg 2 is also integrally provided with two resilient engaging walls 8 extending radially in a curve to surround the support wall 7 at both sides thereof, and having a sectionally arc shape. Vertical slits 9 are interposed between the resilient engaging walls 8.

Figure 4:
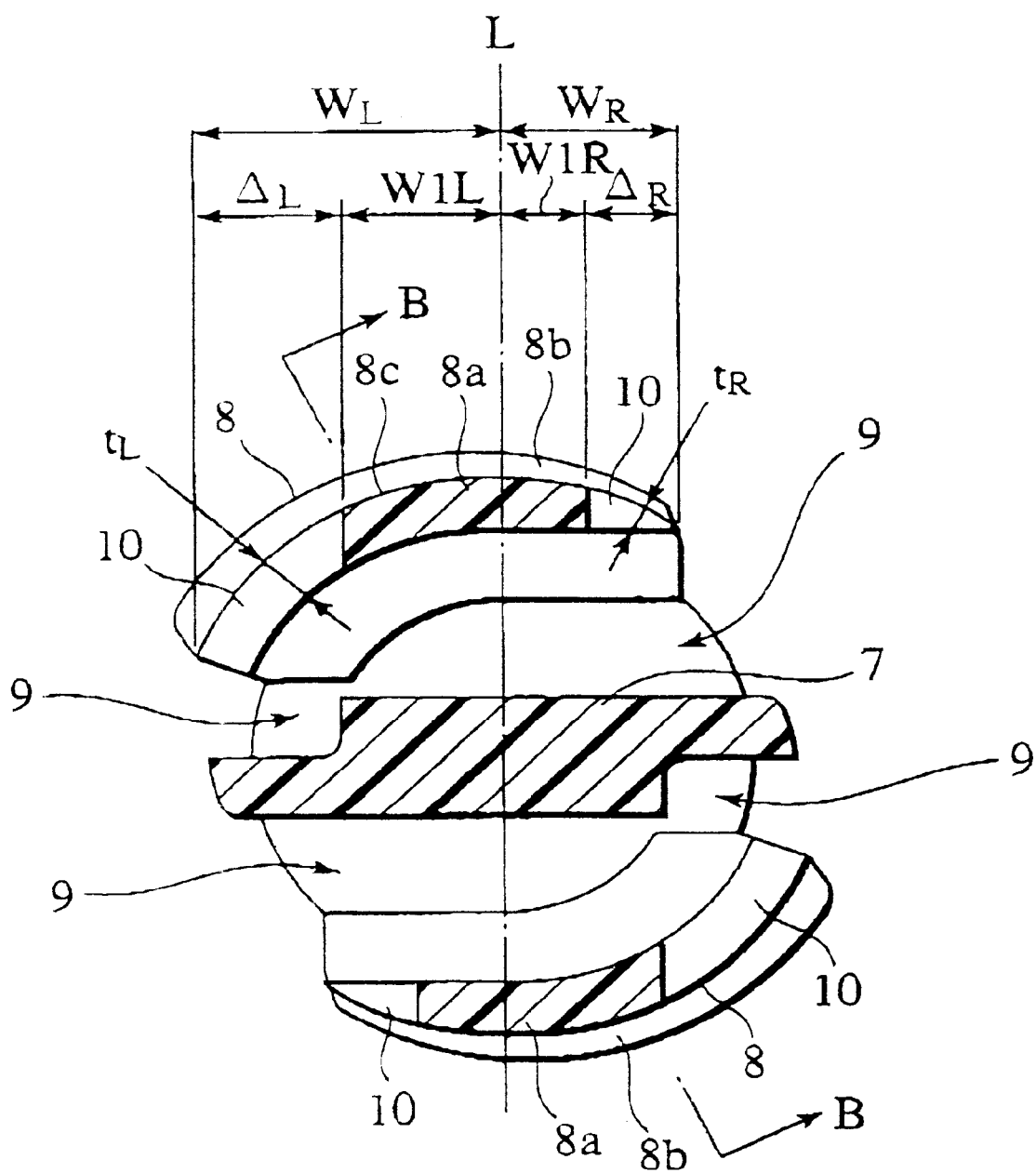
FIG. 4 is a sectional view taken along line A—A in FIG. 2.

An upper end 8a of each resilient engaging wall 8 is basically connected to the rear surface of the sealing flange 6 of the head 1. Lower ends of the walls 8 are connected to a lower end of the support wall 7. Each wall 8 has a shoulder 8b in an upper portion. The shoulder 8b constitutes a slope with its radius from the axis of the fastener gradually increasing as being away from the head 1. As shown in FIGS. 2 and 4, the shoulder 8b has different vertical positions across the resilient engaging wall 8. The wall 8 is further provided with a lateral cut 10 on each side of the upper end 8a connected to the sealing flange 6.

Figure 5:
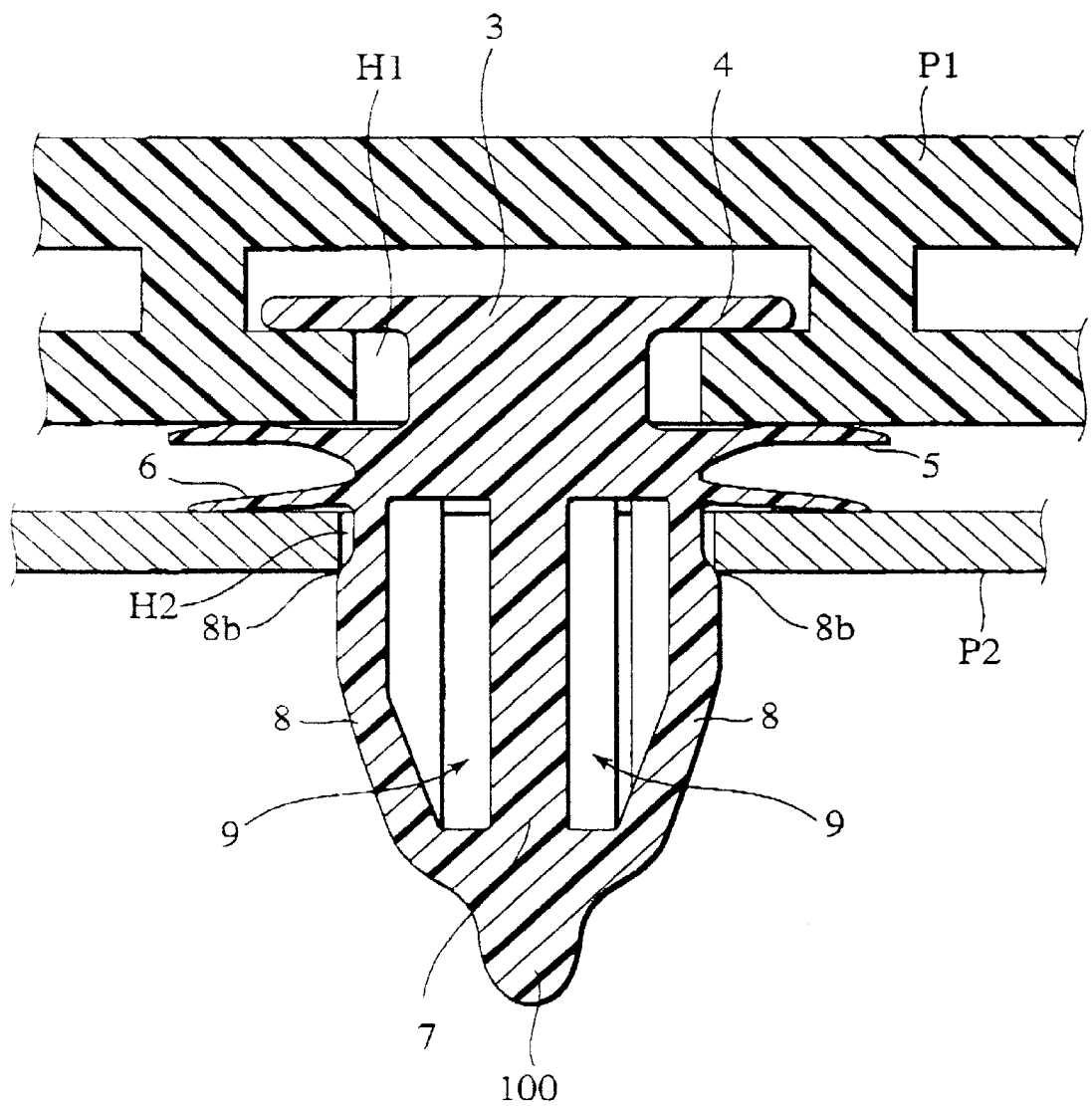
FIG. 5 is a sectional view of the fastener fixing a trim board to a panel.

To fix a trim board P1 to a panel P2 using the fastener of such a structure as shown in FIG. 5, projections defining part of a T-shaped hole H1 of the trim board P1 is retained between the flanges 4 and 5 of the head 1, and then the leg 2 of the fastener is inserted into a mounting hole H2 provided in advance in the panel P2, as in a conventional manner. At that time, the opposing resilient engaging walls 8 of the leg 2 flex inwardly utilizing backspace, pass through the mounting hole H2, and resiliently engage with the rim of the mounting hole H2 at the shoulders 8b. Thus, the trim board P1 is securely fixed to the panel P2.

In addition, since the upper end 8a of each wall 8 is provided with the lateral cut 10 on each side in this embodiment as described above, when the leg 2 is inserted into the mounting hole H2 of the panel P2, both sides of the wall 8 having a sectionally arc shape flex inwardly to a larger extent. This enables inserting the leg 2 into the mounting hole H2 with smaller force, and provides significant improvement in workability as compared to the conventional one. Accordingly, if the mounting hole H2 is a reversely punched hole, the fastener is not affected by the presence of a burr, and can be inserted into the hole H2 with smaller force, making such a functional effect significantly larger.

Further, since each wall 8 is not completely separated from the sealing flange 6 of the head, but is connected at a middle part 8c of the upper end 8a to the sealing flange 6, the wall 8 is prevented from falling down inwardly or collapsing. This ensures secure and firm fixing of the leg 2 to the mounting hole H2 as in a conventional manner.

Now details of the cut 10 are described below.

As shown in FIG. 4, the cut 10 provided, with a perpendicular line L to the support wall 7, passing through the axis thereof, as the center, on the side where the upper end 8a of the resilient engaging wall 8 has a larger thickness tL, has a depth $\Delta L$ that is larger than a depth $\Delta R$ of the cut 10 provided on the side where the end 8a has a smaller thickness tR.

Thus the thicker part of the wall 8 becomes more flexible due to the larger depth $\Delta L$ of cut, and the thinner part of the wall 8 retains rigidity due to the smaller depth $\Delta R$ of cut, so that flexibility and rigidity are equalized on both sides of the wall 8. This prevents the wall 8 from partially collapsing, and also from being partially shaved off by a burr of the rim of a reversely punched hole, thereby allowing the wall 8 to flex evenly in a wider region with respect to the inner periphery of the hole, and resultantly to be inserted with smaller force. The wall 8 then abuts against the inner periphery of the hole in a wider region, and can be even more sufficiently retained.

Further, the cut 10 provided, with a perpendicular line L to the support wall 7, passing through the axis thereof, as the center, on the side where the resilient engaging wall 8 has a larger width WL in a direction along the support wall 7 has the depth $\Delta L$ that is larger than the depth $\Delta R$ of the cut 10 provided on the side where the wall 8 has a smaller width WR.

Accordingly, the wall 8 on the larger width side is more flexible due to the larger depth $\Delta L$ of cut, and the wall 8 on the smaller width side retains rigidity due to the smaller depth $\Delta R$ of cut, resulting in the effects as described above.

Furthermore, as shown in FIG. 2, the cut 10 provided on the side where the shoulder 8b of the wall 8 has a larger distance HL from the head 1, has the depth $\Delta L$ that is larger than the depth $\Delta R$ of the cut 10 provided on the side where the shoulder 8b has a smaller distance HR from the head 1.

Accordingly, the shoulder 8b on the smaller distanced side has relatively high rigidity due to the smaller depth $\Delta R$ of cut, and engages with the inner periphery of the hole of the panel with sufficient strength after inserted into the hole and abutting on the inner periphery of the hole. The sufficient strength causes the wall 8 to exert high stress at the shoulder 8b. The shoulder 8b on the larger distanced side has a radius from the axis of the fastener smaller than that on the other side, and that part is enhanced in flexibility due to the larger depth ΔL of cut, although the engaging strength of that part of the shoulder 8b inserted into the hole of the panel and abutting on the inner periphery of the hole becomes slightly smaller. As a result, even when the fastener is under high temperature in a car in hot weather, for example, and has been used for a long time, the fastener is unlikely to creep or collapse, ensuring high durability.

Further, the part of the connected part 8c of the resilient engaging wall 8 left between the cuts 10, provided on the side, with a perpendicular line L to the support wall 7 as the center, where the resilient engaging wall 8 has the larger width WL in a direction along the support wall 7, has a width W1L that is larger than a width W1R on the side where the wall 8 has the smaller width WR, as shown in FIG. 4.

Accordingly, the wall 8 on the larger width side becomes more flexible due to the larger depth ΔL of cut while being supported by the larger width part of the connected part 8c, and the wall 8 on the smaller width side retains rigidity due to the smaller depth ΔR of cut while being supported by the smaller width part of the connected part 8c, thereby being equalized in flexibility and rigidity. The wall 8 thus flexes evenly in a wider region with respect to the inner periphery of the hole of the panel, being able to be inserted into the hole with much smaller force. The wall 8 also abuts evenly in a wider region against the inner periphery of the hole, being resultantly much more stably retained.

Although in the above embodiment, mounting a trim board as a vehicle interior component is an intended use, this invention is not limited to this, and can be applied to mounting a harness as vehicle electrical equipment, for example.

The present disclosure relates to subject matter contained in priority Japanese Patent Application No. 2000-279459, filed on Sep. 14, 2000, the contents of which is herein expressly incorporated by reference in its entirety.

What is claimed is:

1. A resilient fastener clip comprising:

a head configured for retaining a vehicle component; and a leg configured to be axially fitted into a mounting hole of a panel, the leg comprising a plurality of resilient engaging walls extending axially with a plurality of axial slits therebetween, said plurality of resilient engaging walls connected to the head at proximal ends thereof, and interconnected at distal ends thereof, each resilient engaging wall of said plurality of engaging walls having a thin side and a thick side, said thick side being greater in thickness than said thin side;

wherein each said resilient engaging wall has a first lateral cut in a proximal end of said thin side, and a second lateral cut in a proximal end of said thick side, said second lateral cut having a greater depth than that of said first lateral cut.

2. A resilient fastener clip comprising:

a head configured for retaining a vehicle component;

a leg configured to be axially fitted into a mounting hole of a panel, the leg comprising a plurality of resilient engaging walls extending axially with a plurality of axial slits therebetween, said plurality of resilient engaging walls connected to the head at proximal ends thereof, and interconnected at distal ends thereof; and a support wall axially extending between each said resilient engaging wall, the support wall being connected to said head and said plurality of resilient engaging walls; wherein, each said resilient engaging wall has a narrow side and a wide side, said wide side being greater in lateral width than said narrow side, with respect to an axial center of said support wall; and each said resilient engaging wall has a first lateral cut in a proximal end of said narrow side, and a second lateral cut in a proximal end of said wide side, said second lateral cut having a greater depth than that of said first lateral cut.

3. A resilient fastener clip comprising:

a head configured for retaining a vehicle component;

a leg configured to be axially fitted into a mounting hole of a panel, the leg comprising a plurality of resilient engaging walls extending axially with a plurality of axial slits therebetween, said plurality of resilient engaging walls connected to the head at proximal ends thereof, and interconnected at distal ends thereof; and a support wall axially extending between each said resilient engaging wall, the support wall being connected to said head and said plurality of resilient engaging walls; wherein, each said resilient engaging wall has a narrow side and a wide side, said wide side being greater in lateral width than said narrow side, with respect to an axial center of said support wall; and each said resilient engaging wall has a first lateral cut in a proximal end thereof with a first connected part on said narrow side, and a second lateral cut in a proximal end with a second connected part on said wide side, said second connected part being greater in the lateral width than said first connected part.

4. A resilient fastener clip comprising:

a head configured for retaining a vehicle component; and a leg configured to be axially fitted into a mounting hole of a panel, the leg comprising a plurality of resilient engaging walls extending axially with a plurality of axial slits therebetween, said plurality of resilient engaging walls connected to the head at proximal ends thereof, and interconnected at distal ends thereof, each resilient engaging wall of said plurality of engaging walls comprising:

a shoulder extending from one side of each said resilient engaging wall to another side thereof, sloping away from the head and increasing in radius;

a first lateral cut in said proximal end at said one side; and a second lateral cut in said proximal end at said another side, said second lateral cut having a greater depth than that of said first lateral cut.

* * * * *